United States Patent [19]
Van Maanen

[11] Patent Number: 5,465,824
[45] Date of Patent: Nov. 14, 1995

[54] STACKING DEVICE

[75] Inventor: Johannes D. Van Maanen, Berkel En Rodenrijs, Netherlands

[73] Assignee: Klöckner Hänsel Tevopharm B.V., Netherlands

[21] Appl. No.: 212,587

[22] Filed: Mar. 11, 1994

[30] Foreign Application Priority Data

Mar. 11, 1993 [NL] Netherlands ............ 9300442

[51] Int. Cl.$^6$ .................................. B65G 57/11
[52] U.S. Cl. ............ 198/418.4; 53/152; 414/791
[58] Field of Search ............ 198/418.4; 414/791, 414/790.3; 53/152, 153, 540

[56] References Cited

U.S. PATENT DOCUMENTS

| | | | |
|---|---|---|---|
| 4,413,462 | 11/1983 | Rose | 53/540 |
| 4,450,949 | 5/1984 | Buschor | 198/422 |
| 4,646,908 | 3/1987 | Gambetti | 198/418.4 |
| 5,092,448 | 3/1992 | Cinotti | 198/418.4 |

FOREIGN PATENT DOCUMENTS

| | | |
|---|---|---|
| 0260363 | 3/1988 | European Pat. Off. . |
| 0354469 | 2/1990 | European Pat. Off. . |
| 0521428 | 1/1993 | European Pat. Off. . |
| 76464 | 10/1970 | Germany ............ 414/791 |
| 3827063 | 2/1990 | Germany . |

*Primary Examiner*—Michael S. Huppert
*Assistant Examiner*—Janice L. Krizek
*Attorney, Agent, or Firm*—Vinson & Elkins

[57] ABSTRACT

Stacking device for stacking groups of articles on top of each other, the articles being supplied to that stacking device in a single stream and at a common first level, the device comprising moveable elements which are substantially parallel to the article track, and which are adapted to receive one or more articles each time, and which are designed to move through a first track section and a second downstream track section, wherein in said first track section, articles are to be received and in said second track section, the articles are to be delivered at a subsequent level different to that of said first level, and means, in or beyond the second track section viewed in downstream direction, for positioning a group of articles, successively located at various levels, substantially on top of each other, wherein each time the level of the elements in said first and second track part is substantially the same.

21 Claims, 3 Drawing Sheets

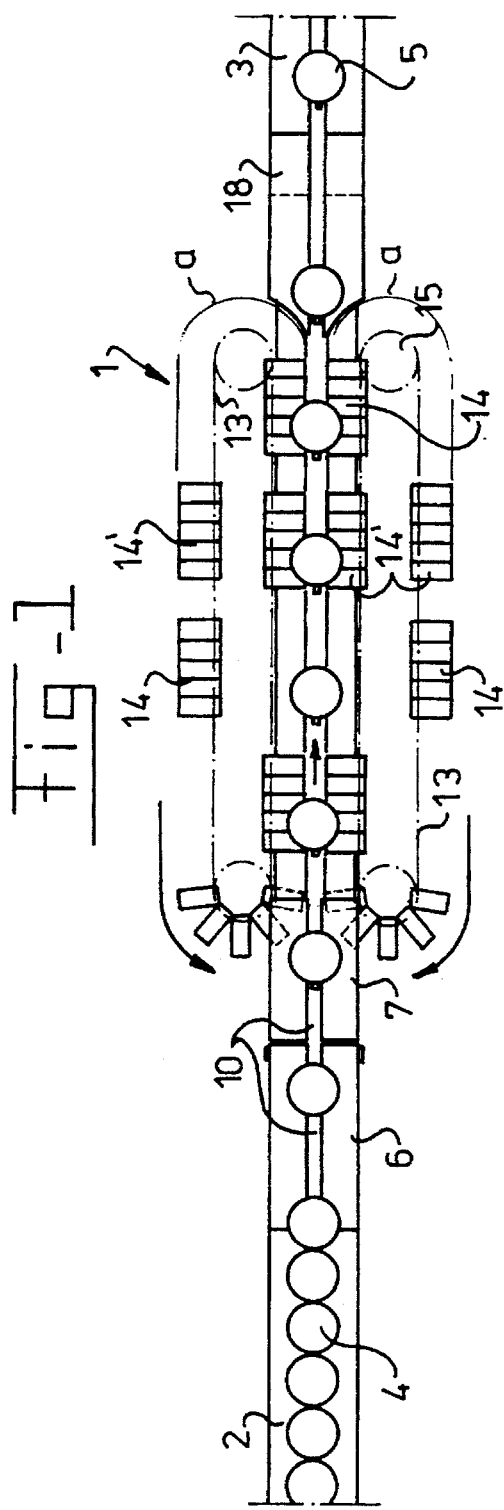
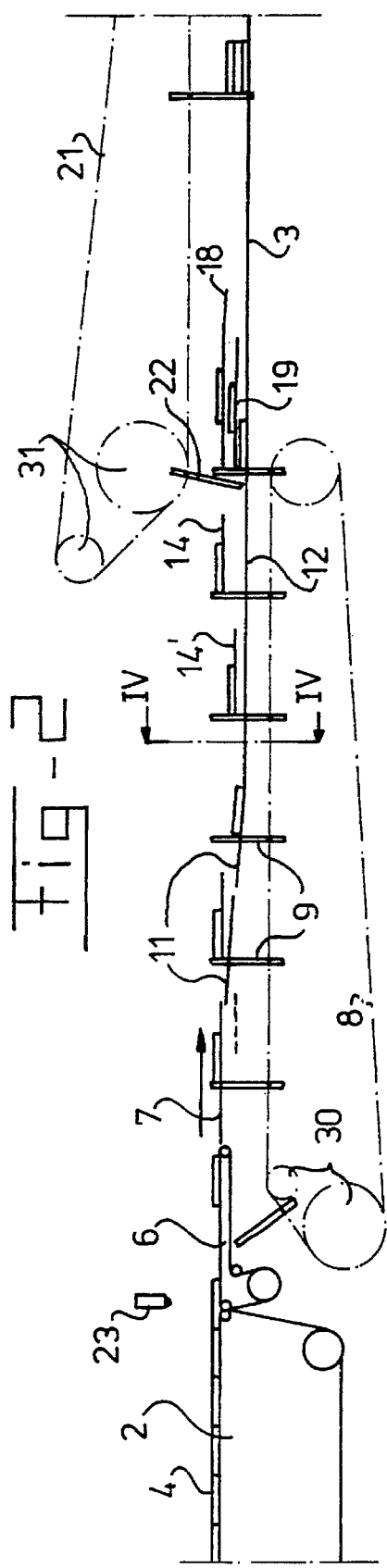

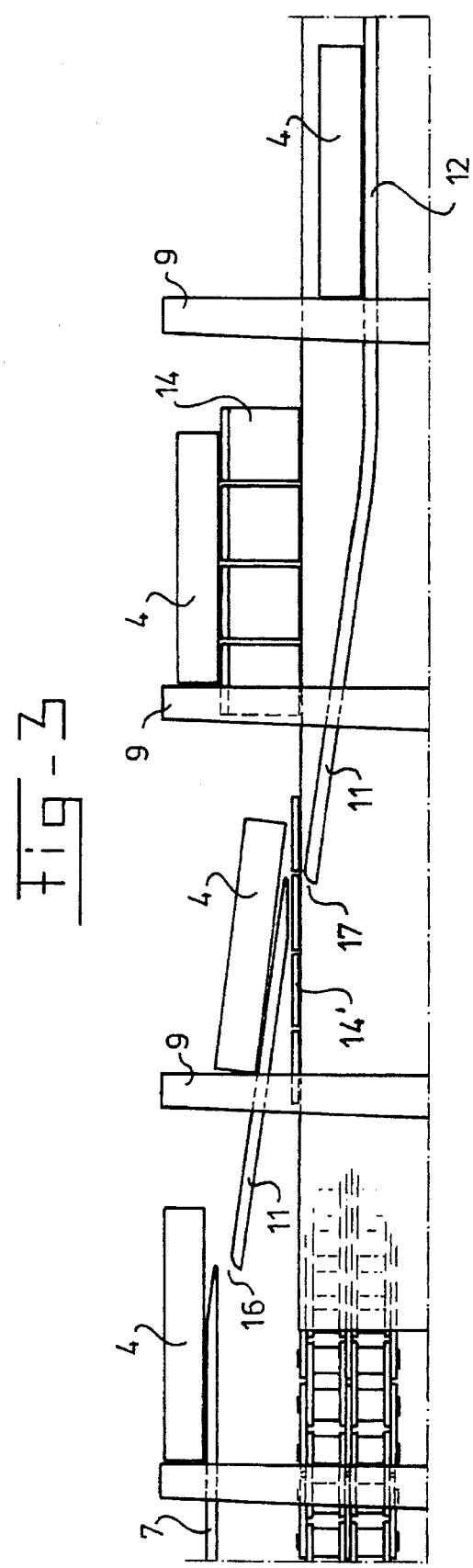

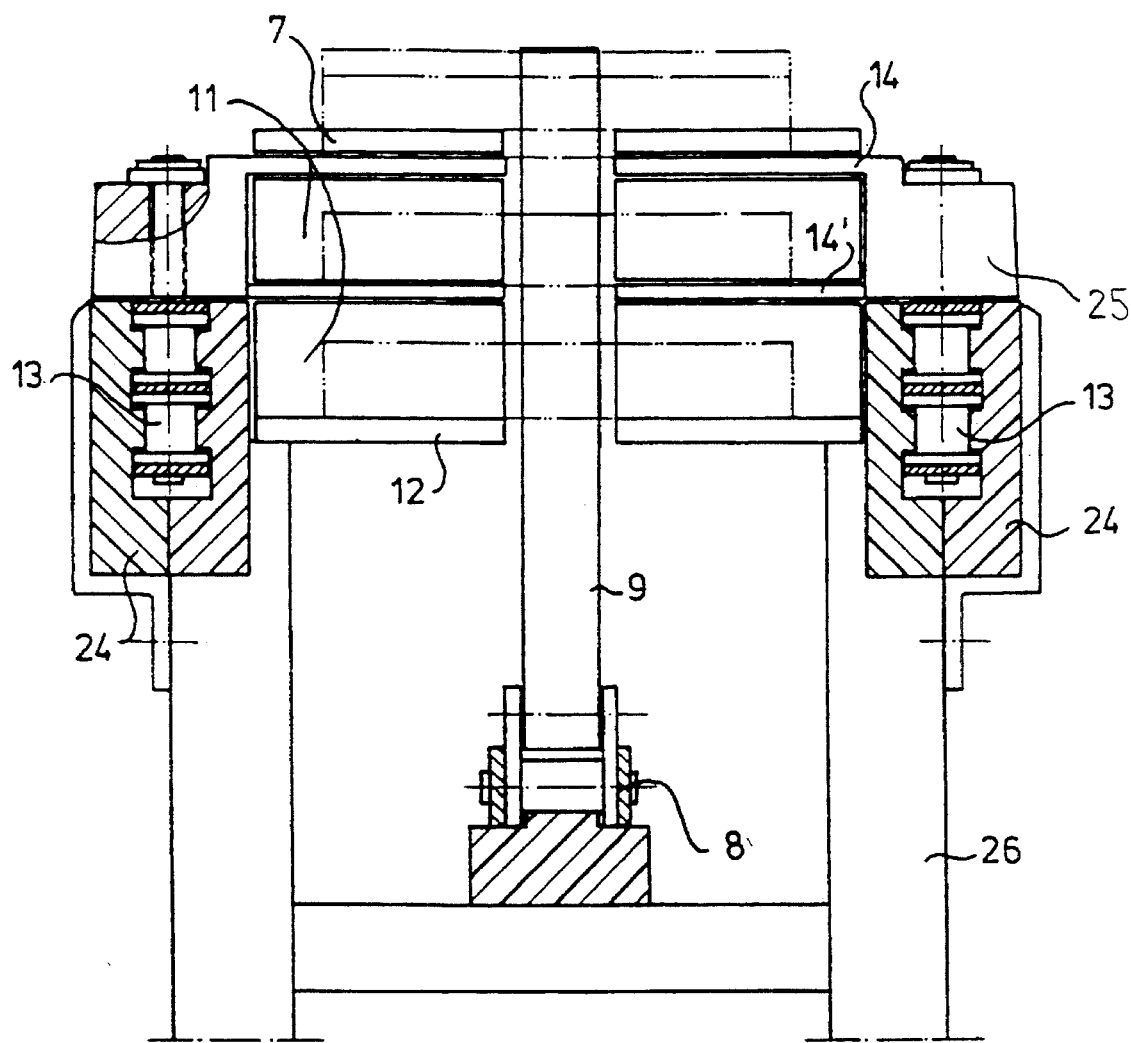

STACKING DEVICE

BACKGROUND

The invention relates to a stacking device for stacking articles or article groups on top of each other, the articles being supplied to that stacking device in a single stream and at a common first level, the device comprising elements which are moveable substantially parallel to the article track, which are adapted to receive one or more articles each time, and which are designed to move through a first track section and a second downstream track section, wherein in the first track section, articles are to be received and in the second track section, the articles are to be delivered at a subsequent level different to that of said first level, and means, in or beyond the second track section, for positioning a group of articles, successively located at various levels, substantially on top of each other.

A similar stacking device is known from the German "Offenlegungsschrift" 3827063. The stacking device described in it makes use of sets of moveable plateaus, installed opposite each other on both sides of the article stream and parallel to the article stream, which receive an article between them each time. The elements move in a loop lying in a plane substantially parallel to the article stream. While a set of elements with an article in between moves downstream, the set is also raised to a specific level. For a number of consecutive sets, where the number corresponds to the number of articles in the stack to be taken up, each next set is raised to a higher level. At the same time, the speed of motion of that number of sets decreases in such a way that the sets at different levels move above each other. Following this, each article is deposited on the article underneath it, and the undermost article onto a further conveyor belt. An article stack is thus built, while maintaining a forward movement during the formation of the stack.

Another stacking device is known from the European patent specification 0312490, wherein successively supplied articles are deposited on a single plateau, the level of which after receiving the article is lowered approximately the height of the article. Each following article falls thus automatically on top of the preceding article, and when the stack is complete, this is removed from the plateau and is moved downstream. For creating a stack with this known device, it is thus a necessity that all articles are slowed down to a standstill, after which the stack is again accelerated. Consequently, this known device is little suited to high speed processing of articles delivered in one stream.

Furthermore, U.S. Pat. No. 4,413,462 specifies supplying articles in two parallel streams and at the same level, after which the one stream is then lifted above the other stream, to bring the two parallel streams immediately above each other. Next, with the aid of a driver, two articles are "swept" on top of each other, so that, consequently, at the end of the upper level they are dropped on top of each other. Although no important deceleration and/or acceleration of the articles occurs for the creation of the stack, the disadvantage is that there have to be two article streams to be created next to each other, and following that those streams must be brought above each other. A stacking device which is suited for such operation is consequently complex, and, for efficient operation, only suitable for stacks of only two articles.

EP-A-0 521 428 concerns another stacking device, using a large vertically disposed rotating stacking wheel, having circumferential recesses of different depth. The articles are supplied at one level, and are dropped subsequently in a corresponding recess. By rotating the wheel, the articles in the respective recess are moved downstream and are transferred to fixed slide plates at levels corresponding to the level of the bottom of the respective recess at the position of transfer. This device demands a stacking wheel of large dimensions, with high demands for structural provisions, space, drive systems, maintenance as well as costs. Speed control of the stacking wheel demands high decelerating and accelerating forces, such that the device is less suitable for high speeds of operation. The recesses give rise to problems if the article dimension will be changed. Modification of the device to accommodate another amount of articles in one stack, seems cumbersome, requiring replacement of the stacking wheel. In fact, the recesses are only suitable for relatively elongate articles, supplied cross-wise. Since the chain 3 (refer to FIG. 3) extends within the stacking wheel (for which reason said wheel is divided), it is easily contaminated by substances from the articles, such as if the articles are baked (crumbly) articles. The contaminations give rise to increased failures, while the locations at and around the stacking wheel are difficult to clean. Furthermore, the chain 3 has to protrude into the stacking wheel to a great extent, giving rise to guidance problems with respect to said chain 3 as well as the drivers 4, leading to increased wear and/or costs. There is a chance of damage to the articles, especially at high operational speeds, since they fall down into a recess, which itself is moving upwards at that same moment.

EP-A-0 260 363 shows a stacking device for providing a two-article stack. Articles are fed in one stream towards a chain with spaced bodies protruding from the face of a conveyor belt. Articles are alternatively picked up by the upper face of the bodies, or the upper face of the conveyor belt at the region where the upper part of said conveyor belt is upwardly inclined from below the level of the article stream in a downstream direction. The upper article resting on the body is first decelerated by slide plates at both sides of the body bearing the articles in the same horizontal plane, such that the downstream lower article resting on the conveyor belt will move until immediately below the upper article. A downstream driver subsequently accelerates the upper article to move together with the lower article, and to shift it from the slide plate on to the top of the lower article. This device demands a conveyor belt with lifting bodies running in the vertical plane, with the lower part below the upper part, which can therefor easily become contaminated. Furthermore, this known device is less suitable for high operational speeds, since the articles are lifted by the rising bodies from beneath, possibly leading to upward hitting of the articles, which then can fall from the body or can be damaged. Also, the alignment of the upper face of the bodies and the upper face of the slide plate for deceleration of the upper article needs extreme accuracy. At high operating speeds, when the conveyor belt carrying the bodies is vibrating up and down, the upper articles are alternately carried by the slide plates and the body, possibly giving rise to failures.

SUMMARY OF THE INVENTION

The object of the present invention is to provide a stacking device of the type described in the preamble, with which, without large acceleration or deceleration of the articles, stacks of two or more articles can be built, wherein the stacking device is efficient and uncomplicated, such that the draw backs of the prior art stacking devices are overcome. Consequently, the operation of the stacking device according to the invention is reliable.

The further advantages and characteristics of this stacking device will become apparent from the following description of the embodiments shown in the drawings. Because the elements in the first and second track parts are situated at the same level, the number of moving parts is kept to a minimum. Consequently, the stacking device according to the present invention is insensitive to wear and suitable for high article speeds, of, for example six hundred articles per minute. In addition to this, the sound production of the stacking device according to the present invention is also considerably less in comparison with known stacking devices. A complicated control unit is not required for reliable operation of the stacking device according to the invention. Instead an arrangement corresponding to the international patent application PCT/NL93/00029 of the present applicant/assignee may be used. According to said application, a sensor positioned upstream detects the passage of each article, on the basis of which, as in the device according to the embodiment in FIG. 2, the speed of the belt 6, the chain 13 and the chain 21, are controlled independently of each other, to bring the article stacks in phase with a stack processing unit connected downstream.

The articles can be brought to the various levels advantageously via a fixed chute, wherein the articles are taken from the chute at the level at which an element just passes the chute. A chute with passage openings for the passage of the elements provides a simple, reliable construction. However, if the width of the chute is small enough compared to the article width, such that the articles project in cross wise direction of the chute, no passage openings have to be present, provided the elements do not move in the area of the chute. The chute can slope upwards or downwards. By providing the chute, the articles gradually come in contact with the elements, without falling onto them, or without the need for an upward movement of the elements towards the articles, such that the risk of damage to the articles, or articles bouncing from the conveyor, is substantially decreased.

By letting the elements on each side of the article stream and primarily parallel to it move in a looped pattern, the underside of the device can be built completely free and open, by which fouling of the device for example by falling cake crumbs etc., is limited extensively. This waste matter falls unhindered to the ground, and can be removed easily from there.

Since the device according to the invention is less complicated by the provision of elements keeping the same level at the first track section where they receive the articles and the second track section where they deliver the articles to a further conveyor track, cleaning operations are rather easy and time saving compared to different complicated prior art devices. Furthermore, the moving parts of this device can have a relatively low weight, such that the speed control is rather easy, and decelerating and accelerating forces are kept to a minimum, which allows for even lighter structures.

The device according to the present invention is suitable for all kinds of article shapes. Elongate articles can be fed both lengthwise and crosswise.

Since the articles are carried on the elements over a relatively long distance, for instance compared to EP-A-0 521 428 above, the control of article movement, position for alignment with other articles gathered for the same stack and/or with the packaging device which is usually positioned further downstream, is improved, such that there is less risk for malfunctioning, preventing the frequent necessity for stopping the device temporarily.

BRIEF DESCRIPTION OF THE DRAWINGS

In the following, the invention is further explained by means of non-limiting exemplifying embodiment, with reference to the enclosed drawings. In the drawings:

FIG. 1 shows schematically the top view of a first embodiment of the device according to the present invention, incorporated into a transport chain which is only partly represented here;

FIG. 2 shows a side view of FIG. 1;

FIG. 3 shows a detail of FIG. 2; and

FIG. 4 shows a sectional view according to the line IV—IV in FIG. 2.

DETAILED DESCRIPTION OF THE PREFERRED EMBODIMENTS

With reference to FIGS. 1 and 2, a device 1 according to the invention, incorporated between a supply transporter 2 and a discharge conveyor 3, is shown. Articles 4 are transported from left to right in the drawing. As shown, the articles 4 are supplied adjacent to each other by the feed conveyor, and stacks 5 of three articles 4 are carried away at a distance from each other by discharge conveyor 3 each time.

The device 1 according to the invention has an accelerator 6, which connects to the feed conveyor 2, and with which the articles 4, supplied lying substantially adjacent to each other by the feed conveyor 2, are brought to a greater distance from each other. A slide plate 7 is provided downstream from the accelerator 6. An endless chain 8 with drivers 9 attached at a fixed pitch, shown here only schematically with dashed and dotted lines, is installed centrally under the accelerator 6 and the slide plate 7. The chain is lead around rollers 30, again shown only schematically. In the drawing, only the drivers 9 at the upper part of the chain 8 are shown. The upper part of the chain 8 moves together with the articles 4 in the same direction from left to right in the drawing. The chain 8 is thus so led that a driver 9 at the downstream end of the accelerator 6 comes to protrude above its surface. The accelerator 6, as well as the slide plate 7, is for this purpose provided with a central continuous longitudinal slot 10, through which the drivers 9 can protrude upwards from beneath. The pitch of the drivers 9 and the speed of motion of the chain 8 is adjustable to the speed and the pitch of the articles 4 on the accelerator 6, in such a way that, at the downstream end of the accelerator 6, a driver 9 is repeatedly placed behind an article 4. The driver 9 then ensures that the article 4 is moved over the slide plate 7 in downstream direction.

Track 11, which is longitudinally divided, is located downstream from the slide plate 7, slopes downwards in relation to the slide plate 7, and connects downstream with a conveyor track 12, which, in relation to the supporting surface of the slide plate 7, the accelerator 6 and the feed conveyor 2, lies at a lower level. The discharge conveyor 3 connects further downstream with this conveyor track 12. The active surfaces of the conveyor track 12 and the discharge conveyor 3 are aligned. In addition, the conveyor track 12, as well as the discharge conveyor 3, are equipped with a continuous longitudinal slot 10, to allow upward protrusion of the drivers 9 through the slot from beneath.

From the top view shown in FIG. 1, an endless chain 13 with articulated plateaus 14, 14' is situated at both sides of the conveyor track 12. In FIG. 1, the chain 13 is only schematically shown, and is lead around the also schematically shown guide rollers 15 such that the moving surface of the chain 13 is aligned parallel to the conveyor track 12, and, in this embodiment, moves primarily horizontally. For the benefit of guiding the chain 13 along the guide rollers 15, the plateaus 14 and 14' are articulated. The plateaus 14, 14' are arranged in pairs, as can be seen in FIG. 1. Actually, the arrangement of plateaus 14, 14' must be seen as the plateaus being arranged along the chain 13 with a fixed pitch, and that between a pair of plateaus, one plateau is repeatedly omitted. As shown in FIG. 2, and as will become apparent from the description in combination with FIGS. 3 and 4, of each pair of plateaus, the active surface of plateau 14 is at the same level as slide plate 7, while the active surface of plateau 14' is at a level between that of slide plate 7 and that of the conveyor track 12.

The chain 13 and the plateaus 14, 14' are so arranged that the plateaus overlap the sloping track 11 and the conveyor track 12 at the active part of the chain 13. Moreover, the corresponding plateaus 14 and 14' respectively at the active parts of the chains 13, are situated opposite each other on each side of the drivers 9. In this case, the corresponding plateaus 14 and 14' respectively leave free a space, through which a driver can protrude from underneath to above the plateaus 14 and 14'.

Near the transition to the active part on the upstream side of the chain 13, the plateau 14 moves repeatedly through the slot 16 which is formed between the end of the slide plate 7 and the upstream part of the sloping track 11. The plateau 14' moves repeatedly through the slot 17 between the two parts of the sloping track 11. An article 4, which is moved forward over the slide plate 7 can thus be transferred at the downstream end thereof to a plateau 14 which passes the slot 16 at just that moment. If no plateau 14 passes at that moment, then the article 4 moves together with the driver 9 over the upstream part of the sloping track 11. Arriving at the slot 17, the article can end up on plateau 14' that is just passing the slot 17. If no plateau 14' is present at that moment, then the article 4 is moved forward with the driver 9 over the downstream part of the sloping track 11, coming to rest finally on the horizontal conveyor track 12. Articles 4 supplied in one stream are thus distributed over three separate levels, which are determined by the plateau 14, the plateau 14' and the conveyor track 12 respectively. The device 1 is in this case so synchronized that the speed of the plateaus 14 corresponds with the speed of the drivers 9. The pitch between the articles 4 located on the plateaus 14, 14', as determined on the accelerator 6 and the slide plate 7, is thus primarily maintained up to the upstream end of the conveyor track 12.

At the downstream end, the conveyor track 12 makes a seamless transition into the discharge conveyor 3, which also forms a fixed sliding support for the articles 4. At the downstream end of the conveyor track 12, at a distance above each other and arranged above the conveyor track are two parallel fixed supporting plates 18 and 19. As shown in FIGS. 1 and 2, the upstream extremities of these supporting plates 18 and 19 are immediately above each other. The downstream end of supporting plate 18 lies however further downstream than the corresponding end of supporting plate 19. The supporting plates 18, 19 also have a continuous longitudinal slot 10. The supporting surface of the supporting plate 18 is at the same level as the corresponding surface of the plateau 14. The supporting surface of the supporting plate 19 is aligned with that of plateau 14'. As shown in FIG. 1, the upstream extremities of the supporting plates 18, 19 are rounded to follow the arc of a circle. It is therefore possible for the plateaus 14 to move along close to the supporting plates 18, 19 at the part of the chain 13 that is lead along the guide roller 15. This is all made visible with the aid of the contour line a which is delimited by the free extremities of the joints of the plateaus 14, 14'.

A central chain, which is only partly schematically shown in FIG. 2, is installed above the downstream end of the conveyor track 12, as well as above the discharge conveyor 3, and is guided around guide rollers 31. Drivers 22 are mounted with fixed pitch on this chain 21, and here only the drivers which are on the active or lower part of the chain 21 are shown. The drivers 22 protrude from above through to under the supporting surface of the conveyor track 2 and the discharge conveyor 3. The articles on the supporting surfaces 18, 19 and on the downstream end of the conveyor track 12 are moved with a driver 22.

The operation of the device shown in FIGS. 1 and 2 is as follows:

Articles 4 are supplied to the device 1 by the feed conveyor, in an uninterrupted stream and lying substantially adjacent each other. An observer 23 is set up above the upstream end of the accelerator 6. With this the uninterrupted supply of the articles 4 is controlled. On the basis of the detection of the sensor 23, the speed of the accelerator 6 and of the chains 13 and 21 respectively, can by controlled, in a way such as, for example, is described in the Dutch patent application 9200154. Control of the speed of the drivers 9 and 22, as well as the positioning thereof in connection with the position of the separate articles 4 on the accelerator 6, the slide plate 7, the sloping track 11, the conveyor track 12, the discharge conveyor 3 and the plateaus 14,14' is thus guaranteed.

A driver 9 is positioned behind each article 4 that is located on the downstream end of the accelerator 6, and, with this, that article 4 can be moved to the downstream extremity of conveyor track 12 over the sloping track 11 and this conveyor track 12. Depending on the timely passage of a plateau 14, an article 4 shall be moved from the downstream end of the slide plate 7 to the plateau 14, or will land on the sloping track 11. Once having landed on the plateau 14, the article 4 will be transported to the upstream end of the supporting plate 18 by the driver 9 moving in the same direction. In the other case, where the article 4 lands on the sloping track 11, it will be moved by the driver 9 to the slot 17. With the timely passage of a plateau 14' through the slot 17, the article 4 will be then move onto that plateau 14' by the forward moving driver 9, to then be transported to the upstream end of the supporting plate 19 by the driver 9 moving in the same direction. If passage of a plateau 14' through the slot 17 does not take place, then the article 4 is moved further over the sloping track 11 by the driver 9. This article 4 then lands on conveyor track 12, to be moved over it by driver 9 to the upstream leading end of the discharge conveyor 3. Three articles 4 thus move above the conveyor track 12 on various levels and at a fixed mutual pitch.

The plateaus 14, 14' are rotated out of the active position at the downstream end of the conveyor track 12. The articles 4 are then moved onto the supporting surfaces 18 and 19 respectively by the drivers 9. Then, the driver 9 behind each article is also brought out of the active position, and the operation thereof is taken over by the driver 22 on the chain 21, which comes into contact with the articles which are located at the three levels. These are repeatedly placed behind the last article 4 from a subsequent series of three moving articles 4 at different levels, and those articles move further together in a downstream direction. At the downstream end of the supporting plate 19, the three articles are then located immediately above each other. With forward movement of the driver 22 in the downstream direction, the article 4 on the supporting plate 19 first falls through a small height onto the article 4 lying under it and moving over the discharge conveyor 3. Even further downstream the article 4 which is moving over supporting plate 18 then falls through a small height onto the stack of two articles formed under it. The result, at the downstream end of the supporting plate 18, is thus a stack 5 of three articles 4 which are moved further downstream over the discharge conveyor 3 with a driver 22, for example to a packing machine not shown here.

FIGS. 3 and 4 show the positioning and operation of the plateaus 14 in connection with the sloping track 11 in more detail. FIG. 3 shows clearly in this case the slot 16 which is provided between the downstream end of the slide plate 7 and the sloping track 11, as well as the slot 17 which is positioned in the sloping track itself. The plateau 14 is aligned to pass the slot 16. The plateau 14' is aligned to pass the slot 17. As FIG. 3 shows, one article 4 moves forward over the conveyor track 12, one article 4 rests on the plateau 14, that moves with the same speed as the corresponding driver 9 in the downstream direction, and another article 4 is just moved by the driver 9 from the sloping track 11 onto a plateau 14' which is passing the slot 17, to then commonly move together downstream. A fourth, more upstream-moving article 4 will moreover, due to the absence of the passage of a plateau 14 through the slot 16, be moved from the slide plate 7 onto the sloping track 11 by the driver 9. From FIG. 3 it is clearly deducible that the supporting surface of the plateau 14 lies just under the supporting surface of the slide plate 7, to make passage through the slot 16 possible.

Furthermore, FIG. 4 shows once again the mutual positioning of the conveyor track 12, the plateaus 14 and 14' as well as the slide plate 7 in cross-section. Dashed and dotted lines show schematically how the articles 4 come to rest on the different supports. The driver 9 on the chain 8 protrudes from beneath to above the slide plate 7, the plateaus 14, 14' and the conveyor track 12. The chains 13 are each led in casings 24 such that they, as can be seen in FIG. 4, are vertically supported, and so that twisting in the plane of the drawing of FIG. 4 is also prevented. The plateaus 14, 14' are mounted immediately above the chain 13; the plateau 14 has a thickened root 25. Because of the thickened root 25, the plateau 14 is however located at a considerably higher level in comparison with that of plateau 14'. The slide plate 7, as well as the conveyor track 12, are rigidly connected to the frame 26 of the device 1 (not further shown here).

The embodiment variations as described and shown above can of course be altered. The sloping track in the embodiment variant according to FIGS. 1 to 4 can, for example, be omitted. The articles coming from the slide plate 7 then make a free fall onto the plateau 14, the plateau 14' or the conveyor track 12. The plateaus can also be installed on the chain 13 at more than two levels, or at only one level. In addition, it is for example also possible to make the discharge conveyor 3 a driven endless conveyor belt. The drivers 22 would then only have to be operational up to the downstream end of the supporting plate 18. Moreover, it is, for example, possible to make the plateaus 14, 14' as overlapping pairs, so that for example the downstream ends on both sides lie above each other. The articles 4 located on the plateaus 14, 14' can then, while they move with the plateaus, be already brought above each other, for example with the help of a driver which moves faster than the plateaus. In connection with this, the conveyor track can also be made as a driven endless conveyor belt. This can then be accelerated or decelerated as required in relation to the plateaus 14, 14', so that the article 4 located on it comes to lie directly under the articles on plateaus 14, 14'. At the end of the conveyor track 12, the different articles which are located above each other can be directly moved on top of each other without the necessity of the supporting plates 18 and 19. The plateaus 14, 14' can possibly be driven at speeds independent of each other, and for example be mounted on separate chains, so that, after receiving an article, the speed of a plateau can be increased or decreased in relation to a following or preceding plateau such that the articles on them come to lie directly above each other. It is also possible to mount the plateaus 14, 14' on a chain 13, primarily moving in the vertical plane. Special measures are then taken to avoid that, at the extremities of this chain, the plateaus 14, 14' touch the conveyor track 12. For this purpose, the plateaus can be made pivotable, or retractable. Furthermore, it is also possible to install the chain 8 above the conveyor track 12, and the chain 21 under the conveyor track 12, so that the drivers 9 protrude through the conveyor track from above, and the drivers 22 from beneath. Also, the chain 8, of which the surface of movement protrudes through the longitudinal slot 10, can be equipped with plateaus 14, 14' instead of the drivers 9, the plateaus being slightly narrower than the longitudinal slot 10. An uninterruptable sloping track 11 can then be applied, which seamlessly connects with the slide plate 7. That sloping track 11 can however, also be omitted. If need be, that chain 8 can also be provided with drivers 9 with a fixed pitch, wherein, in combination with the plateaus, the upstream end of such a plateau is repeatedly and immediately followed by a driver 9. Other combinations of the above described and shown embodiments are also possible. Of importance, however, is that a stream of articles supplied together at one level is split into different article streams which are above one another and which are then taken together in one single stream of stacked and separate article groups, wherein, preferably, the plateaus are at a fixed level in their active position, while the articles are brought to the level of the plateaus via a transition part. The invention is therefore further specified with the appended claims.

I claim:

1. A device for stacking articles on top of each other as they travel in a downstream direction in a production line, comprising:

first means for supporting articles on a first level;

second means for supporting articles on a second level lower than said first level, said second supporting means disposed downstream of said first supporting means;

a stationary track disposed between said first and second supporting means, sloping downward in the downstream direction, and defining at least a first slot downstream of said first supporting means but upstream of said second supporting means, said first slot oriented transversely to the length of said track and having a width small enough, measured in the downstream direction parallel to said track, to allow an article to pass over said first slot substantially uninhibited in the downstream direction;

at least one recirculating plateau capable of supporting an article and adapted to follow a path from a first position upstream of said first slot and underneath said track, through said first slot in the downstream direction, to a second position downstream of said first slot and above said track at a third level, and then back again to said first position;

means for driving articles in the downstream direction along said track; and means for collecting articles disposed at said second and third levels, said collecting means disposed downstream of said track.

2. The stacking device of claim 1, wherein said at least one recirculating plateau comprises a plurality of articulated elements attached to an endless chain.

3. The stacking device of claim 1, further comprising:

first and second endless chains disposed on opposite sides of said track and each having a substantially horizontal orientation;

a first plurality of articulated elements attached to said first endless chain; and a second plurality of articulated elements attached to said second endless chain; and wherein said at least one recirculating plateau is formed when said first and second pluralities of articulated elements travel opposite one another in the downstream direction.

4. The stacking device of claim 3, wherein said track defines a second slot oriented longitudinally along the length of said track, wherein said first and second pluralities of articulated elements define a space parallel to said second slot when travelling opposite one another in the downstream direction, and wherein at least a portion of said driving means protrudes through said second slot and said space.

5. The stacking device of claim 4, wherein said driving means comprises:

a third endless chain oriented longitudinally along the length of said track; and a plurality of substantially rigid elements attached at one end to said third endless chain and protruding at the other end through said second slot and said space during at least a portion of the trip around the path of said third endless chain.

6. The stacking device of claim 1, further comprising means for removing collected articles from said collecting means in substantially vertical alignment.

7. The stacking device of claim 6, wherein said collecting means comprises a supporting plate disposed substantially at said third level, said supporting plate defining a second slot oriented longitudinally in the downstream direction; and wherein said removing means comprises an endless chain oriented parallel to the downstream direction, and a plurality of substantially rigid elements attached at one end to said endless chain and protruding at the other end through said second slot during at least a portion of the trip around the path of said endless chain.

8. The stacking device of claim 3, further comprising means for removing collected articles from said collecting means in substantially vertical alignment.

9. The stacking device of claim 8, wherein said collecting means comprises a supporting plate disposed substantially at said third level, said supporting plate defining a second slot oriented parallel to the length of said track; and wherein said removing means comprises a third endless chain oriented parallel to the length of said track and a plurality of substantially rigid elements attached at one end to said third endless chain and protruding at the other end through said second slot during at least a portion of the trip around the path of said third endless chain.

10. Apparatus for stacking articles as they travel in a downstream direction in a production line, comprising:

first means for supporting articles on a first level;

second means for supporting articles on a second level lower than said first level, said second supporting means disposed downstream of said first supporting means;

a stationary track disposed between said first and second supporting means, sloping downward in the downstream direction, and defining a slot oriented transversely to the length of said track; and a moveable plateau capable of supporting an article and adapted to convey an article along a path passing through said slot in the downstream direction.

11. The apparatus of claim 10 wherein said moveable plateau comprises a recirculating plateau.

12. The apparatus of claim 11, wherein said recirculating plateau comprises a plurality of articulated elements attached to an endless chain.

13. The apparatus of claim 11, further comprising:

first and second endless chains disposed on opposite sides of said track and each having a substantially horizontal orientation;

a first plurality of articulated elements attached to said first endless chain; and a second plurality of articulated elements attached to said second endless chain; and wherein said recirculating plateau is formed when said first and second pluralities of articulated elements travel opposite one another in the downstream direction.

14. The apparatus of claim 13, wherein said path passes through a first position upstream of said slot and underneath said track, through said slot in the downstream direction to a second position downstream of said slot and above said track at a third level, and then back again to said first position.

15. The apparatus of claim 13, further comprising means for driving articles along said track in the downstream direction.

16. The apparatus of claim 15, wherein said driving means comprises:

a third endless chain oriented parallel to the length of said track; and a plurality of substantially rigid elements, each attached at one end to said third endless chain.

17. The apparatus of claim 16, wherein said first and second pluralities of articulated elements, when traveling opposite one another in the downstream direction, define a longitudinal space parallel to said track; and wherein said plural substantially rigid elements protrude into said longitudinal space during at least a portion of their trip around said third endless chain.

18. The apparatus of claim 10, further comprising means for collecting articles, said collecting means disposed downstream of said track.

19. The apparatus of claim 18, further comprising means for removing collected articles from said collecting means in substantially vertical alignment.

20. The apparatus of claim 19, wherein said path passes through a first position upstream of said slot and underneath said track, through said slot in the downstream direction to a second position downstream of said slot and above said track at a third level, and then back again to said first position; and wherein said collecting means comprises a supporting plate disposed substantially at said third level, said supporting plate defining a longitudinal space parallel to said track.

21. The apparatus of claim 20, wherein said removing means comprises:

an endless chain oriented parallel to said track; and a plurality of substantially rigid elements, each attached at one end to said endless chain and protruding at the other end through said longitudinal space during at least a portion of its trip around the path of said endless chain.

* * * * *